Dec. 22, 1970    W. W. ANGELL ET AL    3,548,418
GRAFT VALVE TRANSPLANTATION FOR HUMAN HEARTS
AND GRAFT-SUPPPORT RING THEREFOR
Filed May 3, 1968    6 Sheets-Sheet 1

INVENTORS
WILLIAM W. ANGELL
PAUL KAHN

BY
ATTORNEYS

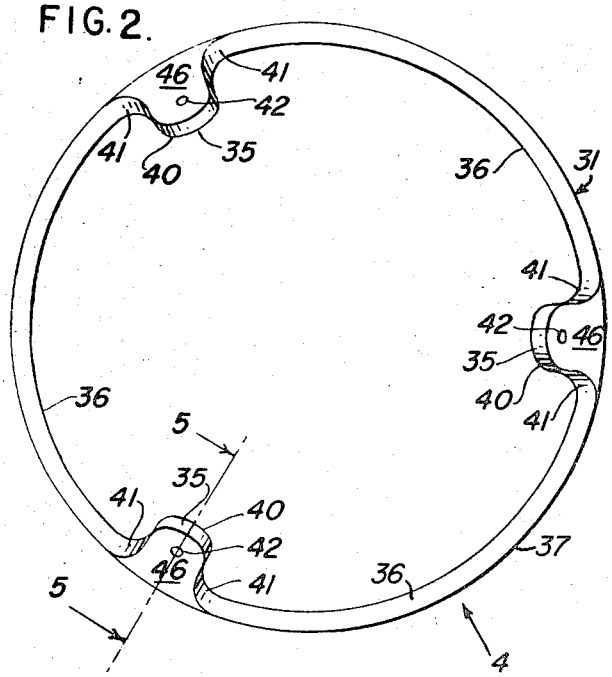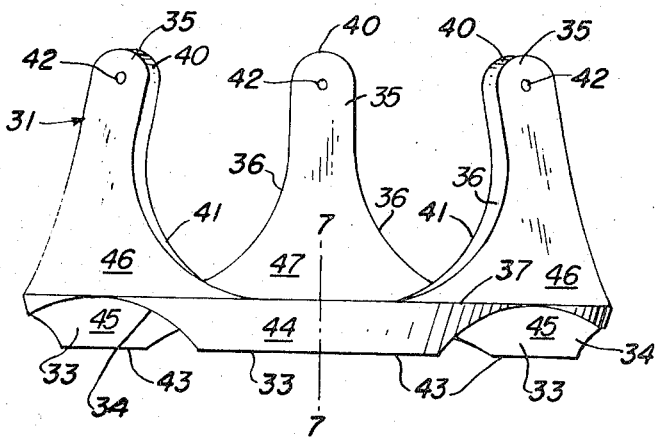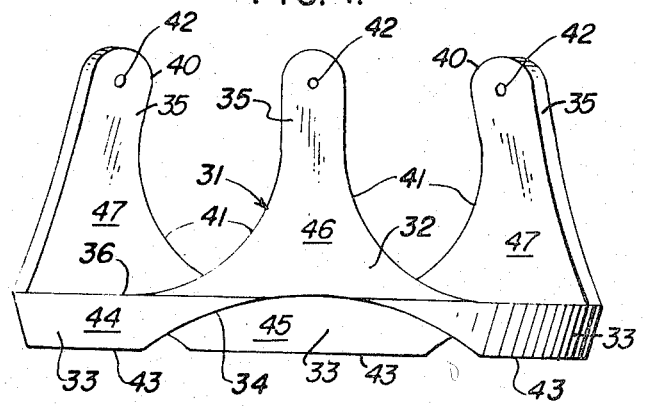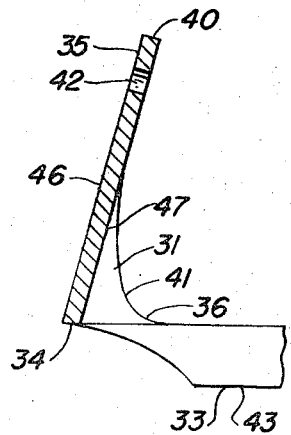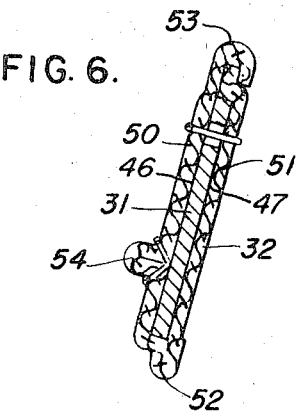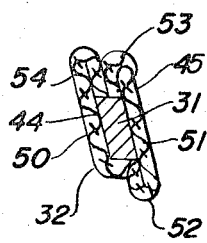

Dec. 22, 1970    W. W. ANGELL ET AL    3,548,418
GRAFT VALVE TRANSPLANTATION FOR HUMAN HEARTS
AND GRAFT-SUPPORT RING THEREFOR
Filed May 3, 1968    6 Sheets-Sheet 3

INVENTORS
WILLIAM W. ANGELL
PAUL KAHN

BY
ATTORNEYS

Pressure Testing of Leaflets

United States Patent Office 3,548,418
Patented Dec. 22, 1970

3,548,418
GRAFT VALVE TRANSPLANTATION FOR HUMAN HEARTS AND GRAFT-SUPPORT RING THEREFOR
William W. Angell, Palo Alto, and Paul Kahn, San Francisco, Calif., assignors to Cutter Laboratories, Inc., Berkeley, Calif., a corporation of Delaware
Filed May 3, 1968, Ser. No. 726,288
Int. Cl. A61f 1/22
U.S. Cl. 3—1                    18 Claims

ABSTRACT OF THE DISCLOSURE

A graft-support ring for graft valve transplantation. A generally annular metal frame is completely enclosed in a fabric covering to which the graft valve and the host heart tissue can be stitched. Preferably, the metal frame is made from titanium and comprises portions of two cones lying on opposite sides of a common base circle, the cone on one side having a surface-to-axis angle of about 70° and having three atrial apices spaced evenly around a circle with flat arcuate terminal edges and separated from each other by three smoothly curved atrial depressions dipping to the base circle. The cone on the other side has a surface-to-axis angle of about 77° and has three ventricular struts opposite the atrial depressions and evenly spaced around a circle and separated by three ventricular reliefs coinciding with the base circle and smoothly connected to the struts. The apices and struts terminate at the same distance from the axes of the two cones. The fabric covering preferably has a first rolled edge generally following the edge of the atrial apices and depressions, a second rolled edge generally following the edge of the ventricular struts and reliefs, and a third rolled edge generally following the edge of the ventricular relief and crossing from relief to relief across the struts. The ring is also suitable for both homograft and heterograft transplantation.

A new method of valve transplantation is also described.

---

This invention relates to the adaptation of grafted aortic valves to the atrioventricular position in human hearts and to a graft support ring used in such adaptation.

Homograft and heterograft semilunar valves have been used as replacements for damaged cardiac valves, for a tissue graft has definite advantages over prosthesis. For example, the ratio of internal to external diameter is optimal, and there is no impedance to central flow. While internal diameter is large, the over-all height is considerably less than the cage-ball type of prosthesis. Also, after endothelialization no prosthetic material is there to be exposed to the blood stream. Most important of all is that there is no thrombogenic surface or joint, so that the risk of complications from thrombosis and emboli is considerably reduced.

The longevity of aortic homografts has been well tested in both the descending aorta and the subcoronary position, and no evidence has been demonstrated that fresh aortic homografts deteriorate with time. They have become standard treatment for aortic valve replacement in many clinics.

Homografts have also been adapted for use in the mitral and tricuspid areas. Direct suturing for semilunar valves into the atrioventricular position has met with some clinical success, but the results have not been predictably consistent. The present invention is directed to solution of this problem and enables predictably consistent results by providing a supporting ring or stent for clinical use with aortic homografts.

Experience with subcoronary placement of tissue valves has indicated that natural reconstruction of the aortic root and valve are essential to prolonged good function, and the invention rests on that basis. When a normal valve is to be used as a homograft, several facts pertinent to this natural reconstruction should be noted: (1) The sinuses of Valsalva are not regular and equal, but vary considerably in size without constant relationships. Valve height fluctuates from valve to valve and commissure to commissure within the same valve. (2) The diameter of the aorta where the commissural attachment reaches its apex is less than the diameter at the sinuses. (3) The sinuses are deeper at their midportion than at the base. Thus, the valve has a bell shape with narrow apex and wide sinuses, which then narrow at the base of the cusp attachment. In order to approximate the normal aortic root, the support ring of the present invention is similarly contoured.

The support ring of this invention comprises a metal frame, preferably machined in one piece from commercially purer titanium, in order to eliminate the possibility of corrosion at the metallic interfaces and casting faults, and a cover of nonabsorbent fabric, preferably knitted tetrafluoroethylene (Teflon), completely encloses the frame and provides a fabric body for suturing and for encouraging tissue ingrowth and endothelialization of all exposed prosthetic surfaces.

The support ring can be used for both homograft and heterograft transplantation and in any intracardiac position.

Other objects and advantages of the invention will appear from the following description of a preferred embodiment and of a new method for its use.

In the drawings:
FIG. 1 is a view in perspective of a graft-support ring embodying the principles of the invention.
FIG. 2 is a top plan view of the metal frame of the graft-support ring of FIG. 1 before it is covered.
FIG. 3 is a view in elevation of the frame of FIG. 2 looking along the direction of the arrow 3 in FIG. 2.
FIG. 4 is a view in elevation of the support frame looking along the direction of the arrow 4 in FIG. 2.
FIG. 5 is a view in section taken along the line 5—5 in FIG. 2.
FIG. 6 is a view like FIG. 5 but with the cover over the frame.
FIG. 7 is a view in section of another portion of the covered ring taken along the line 7—7 in FIG. 3, but with the cover in place.
FIG. 8 is a view in perspective of the ring of FIG. 1 with the cover and frame successively broken away in some places.
FIG. 9 is a simplified fragmentary view in elevation of a cross section of an aorta with a graft-support ring of FIG. 1 therearound.
FIG. 10 is an atrial view in perspective of the ring with a valve for grafting supported by it, the valve being shown in open position.
FIG. 11 is an atrial view in perspective like FIG. 10 but showing the valve in its closed position.
FIG. 12 is a fragmentary view in perspective showing the trimming of an aorta on a valve to be grafted, before the valve is mounted on the graft-support ring.
FIG. 13 is a view in perspective showing the step of trimming the myocardium from the valve of FIG. 12.
FIG. 14 is an end view of the trimmed aortic homograft valve of FIG. 13 before it is attached to the ring, the valve being in closed position.
FIG. 15 is a view from the other end of the aortic homograft valve before attachment to the ring, the valve being in open position.

Figure 1:
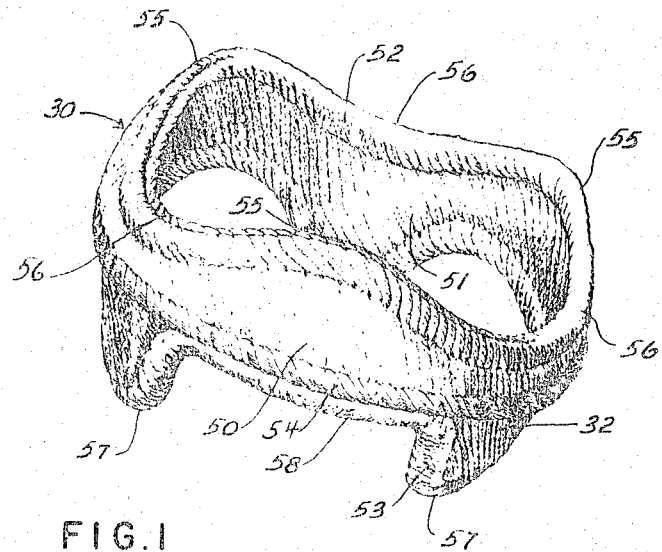

A graft-support ring 30 of this invention comprises two principal members, a metal frame 31 and a knitted cover 32. The frame 31 is preferably machined in one piece, preferably from commercially pure titanium, so that the possibility of corrosion at metallic interfaces is eliminated and so is the possibility of casting faults. The cover 32 is preferably made from knitted tetrafluoroethylene, so that there is excellent protection from attack by the body fluids. Other noncorrosive metals may be used, as may other non-absorbent fabrics, but these are preferred.

As shown particularly in FIGS. 2 through 5, the metal frame 31 has a unique structure. Like an aortic valve, the ring frame 31 is preferably characterized by triplicity, with three identical atrial apices 33 alternating with three identical atrial depressions 34 and spaced around the annular frame 31, either at regular intervals or irregularly, as in some human hearts; likewise it preferably has three identical ventricular struts 35 between which are three ventricular reliefs 36, all located around a base circle 37. Geometrically considered, the apices 33 on the one hand and the struts 35 on the other hand preferably belong to two cones intersecting or having a common base at the circle 37. Thus, the three apices 33 may be considered as residual portions of one conical shell wherein the surface preferably lies at an angle of about 70° to the axis of the cone, this axis passing through the center of the circle 37 and perpendicular to the plane of that circle. Similarly, the struts 35 may be considered as residual portions of another conical shell having its base on the same circle and with its surface preferably lying at an angle of about 77° to the same axis. Thus, the departure from cylindrical shape is about 20° for what can be termed the atrial cone and about 13° for what can be termed the ventricular cone. Instead of being truly conical segments, the struts 35 and apices 33 may turn inwardly about a radius in other ways.

The frame 31 is purposely made as light and unbulky as is compatible with the needed strength and with avoidance of sharp edges. Thus, the struts 35 have rounded extremities 40 and are connected to the circle 37 by smooth curves 41 to give the relief 36 a nearly rectangular shape. Each strut 35 has a single anchor opening 42. Also, each struct 35 is centered in alignment with the center of the parabola-like depression 34 and each apex 33 is centered in alignment with the center of a relief 36. Each apex 33 has a short top surface 43 between two of the parabola-like depressions 34, which if extended would form a sharp cusp. The surfaces 43 of the apices 33 may lie closer to the circle 37 than the extremities 40 of the struts 35, but preferably the surfaces 43 and extremities 40 lie along a common cylinder of development, i.e., they are the same distances from the axis of the cones. It is convenient later to refer to the outer surface 44 and inner surface 45 of the atrial cone and to the outer surface 46 and inner surface 47 of the ventricular cone. The shell thickness in both cones may be about one millimeter or less.

The cover 32 closely follows the frame 31 to provide a complete enclosure with an outer layer 50 over the surfaces 44 and 46 and an inner layer 51 over the surfaces 45 and 47. A rolled edge 52 (or other thickened cloth portion suitable for anchoring sutures) follows and lies beyond the upper atrial edge above the apices 33 and depressions 34; a second rolled edge 53 follows and lies beyond the lower ventricular edge, below the struts 35 and reliefs 36. In some covers 32 there is a third rolled edge 54 that follows the reliefs 36 but extends across the struts 35. Each of these three rolled edges 52, 53, and 54 gives a body or support to sew around or through when attaching the homograft to the ring 30 and when inserting the assembly into the human body.

Figure 9:
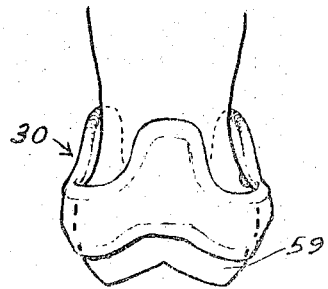
Figure 8:
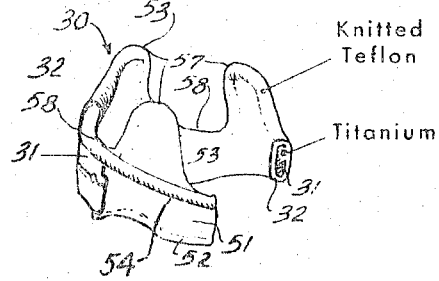
Figure 11:
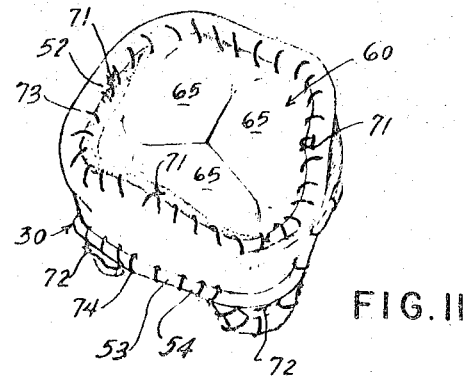
Figure 10:
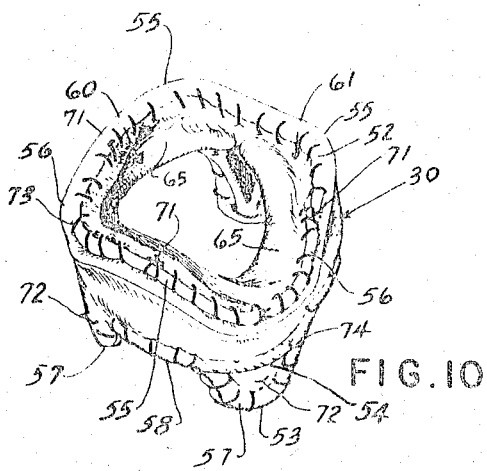

The completed ring 30 thus has its own atrial apices 55 and depressions 56 and its own ventricular projections 57 and relief 58 resulting from the combination of the coved 32 and the frame 31, and is shaped basically like the frame 31. As shown in FIG. 9, the ring 30 approximates the shape of the outer surface of a normal aortic root 59.

Typical ring sizes are shown in the following table, in which the inner diameter is the diameter of the cylinder of development referred to, to which the inner surfaces of the extremities 40 and surface 43 are tangent. The outer diameter is that of the outer edge of the circle 37, the height is the distance parallel to the cones' axis from the covered extremities 40 to the surfaces 43, and the tissue annulus is midway in size between the inner and outer diameters.

TYPICAL RING SIZES, IN MILLIMETERS

| Inner diameter | Outer diameter | Tissue annulus | Height |
|---|---|---|---|
| 20 | 24.8 | 22.4 | 16 |
| 26 | 30.8 | 28.4 | 17.3 |
| 27 | 31.8 | 29.4 | 19 |
| 28 | 32.8 | 30.4 | 20 |
| 29 | 33.8 | 31.4 | 21 |
| 30 | 34.8 | 32.4 | 22 |
| 31 | 35.8 | 33.4 | 23 |

In use, an aortic homograft valve 60 (see FIGS. 10–16) is procured from a cadaver deceased less than 12 hours. It is preferable that the donor be less than sixty years of age. The valve 60 is removed under sterile conditions and transferred to a medium such as Hank's Base (Grand Island Biological Co., Grand Island, N.Y.) with 1 cc. of antibiotics supplying 10,000 units of penicillin and 10,000 micrograms of streptomycin per cc. The valve 60 may be stored in this solution at 40° C. for not more than five days. The valve 60 may be cultured by washing fragments of excess homograft tissue in Brain-Heart-Infusion Broth and inoculating 0.1 cc. aliquots onto sheeps blood agar plates for aerobic and anaerobic culture. The character and extent of tissue contamination can thus be estimated. Tissue fragments may also be cultured directly to assure that even small numbers of organisms are detected.

Figure 12:
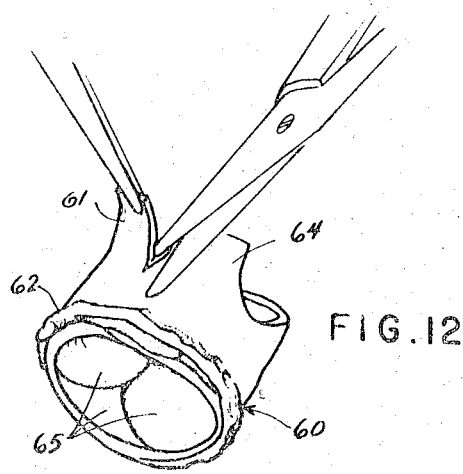
Figure 13:
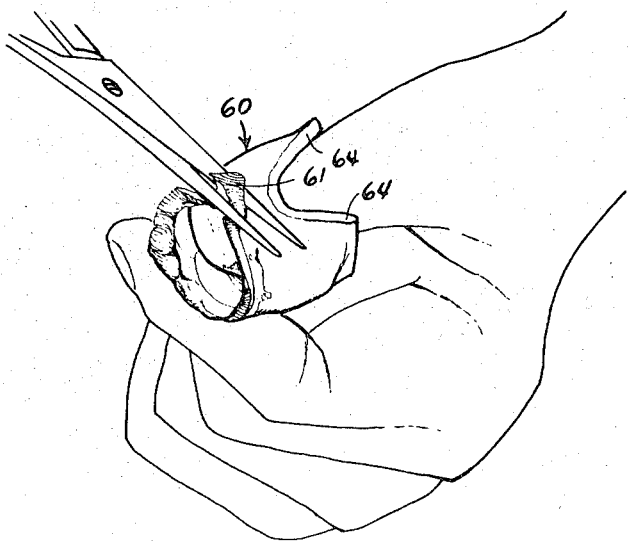

Twelve hours prior to surgery the fresh sterile homograft valve 60 is dissected from excess aorta and myocardium 61, as shown in FIGS. 12 and 13, in preparation for securing it to the support ring 30. Adequate tissue is left to allow fixation to the ring 30. A 4–5 mm. cuff of aorta 62 is left in each sinus 63 and above each commissural attachment 64 (FIGS. 12–15). Excess adventitia 61 is dissected off the external aortic wall 62. All free myocardium is dissected from the annular attachment leaving adequate fibrous tissue at the base 67 of each cusp 65.

Residual muscle attachment 66 retains the color of muscle fibers, but in fact only tough fibrous tissues should be left. The valve 60 is kept moist in Ringer's lactate throughout the dissection. Care must be taken not to damage the valve leaflets or to incise the external wall of the sinus 63.

Figure 14:
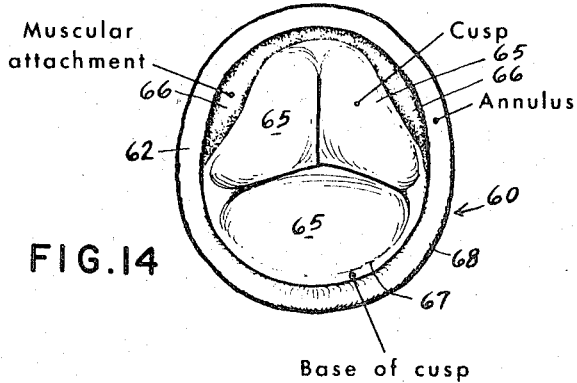
Figure 15:
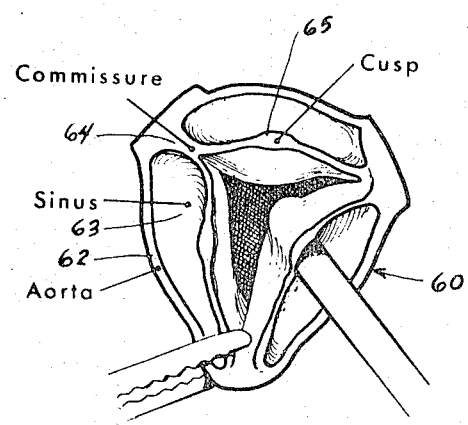
Figure 18:
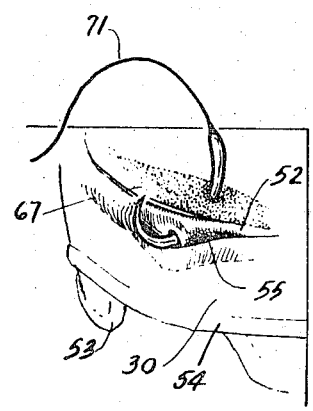
FIG. 18 is an enlarged fragmentary view in perspective of a part of FIG. 17, illustrating the beginning of the suture operation by which the homograft is attached to the graft-support ring.

The anatomy and description of the aortic homograft are as shown in FIGS. 14 and 15. All anatomic portions of the dissected valve are important. The commissural attachments 64 are composed of extremely tough fibrous tissue which holds sutures well. A mattress suture across the attachment and into the fabric 32 is essential for adequate anchoring at the main point of stress. A cuff 62 of aortic wall above commissures 64 and sinuses 63 is essential to circumferential securing of the valve 60 on its upper surface. The sinuses 63 are left intact as a normal broad supporting attachment for the cusp 65 itself. The base 67 of the cusp attachment at the bottom of the valve 60 is an extremely important anchoring point. Tissue in this area is inconsistent circumferentially. It is tough and fibrous where the aortic leaflet of the mitral valve comes in approximation to the aortic valve. By contrast, some portions of the annulus have a muscular attachment 66 to the ventricle as noted previously (FIG. 14). After the excess tissue is dissected away, however, there is always good firm tissue for suturing at the base of the cusp attachments. At that point under the right coronary sinus where ventricular muscle attaches directly to the aortic annulus, care must be taken to suture through the tough fibrous anchoring tissue. This is actually 3–4 mm. from the true leaflet attachment as shown in FIG. 18.

Figure 16:
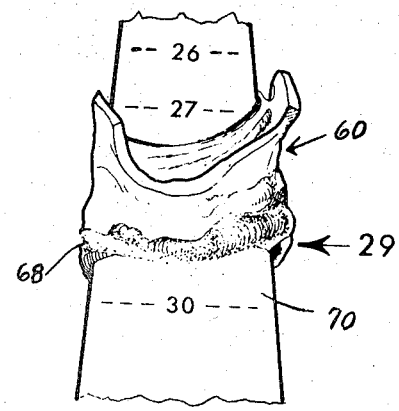
FIG. 16 is a view in elevation of a sizing ring on which the aortic homograft valve of FIGS. 14 and 15 is being sized.

As shown in FIG. 16, the aortic homograft annulus 68 is measured with a sterile cone-shaped ring sizer 70 or obturator. The moist valve 60 is gently placed on the sizer 70, being careful not to damage the cusps 65 by forcing the homograft 60 onto the cone 70. Annulus diameter is measured, and the indicated figure approximates the proper size ring 30 for that particular valve 60.

There is considerable variation in homograft shape, so that the initial mitral ring 30 which is selected may prove to be too large or too small after initial testing. When all excess tissue is removed from the valve 60, it is examined for annular size and sinus and cusp disparity. A ring 30 of the indicated internal diameter is selected. If the proper support ring 30 is selected, almost any normal valve 60 can be adjusted to fit well with good cusp support and no incompetence.

Figure 17:
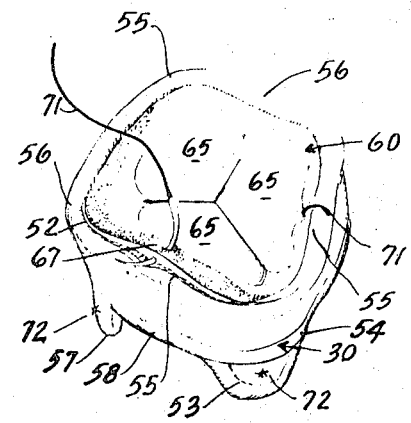
FIG. 17 is an atrial view in perspective of the beginning of the attachment of the aortic homograft to the graft-support ring.

Suturing sequence is essential to competency of the leaflets. First, as shown in FIGS. 17 and 18, the base 67 of the cusp 65 must be attached to the rolled edge 52 internal cloth flange at the center of the sinuses 63 in three places by a suture 71 carried through tough fibrous tissue. The leading edge of the cusp attachment is brought to the ring edge in two of the sinuses. It is imperative that the right coronary sinus 63, which has a muscular attachment 66 to the ventricle, be secured above the free edge of the cusp base 67. This prevents retraction of the cusp 65 and resultant insufficiency by downward displacement to the point of cusp approximation.

Figure 19:
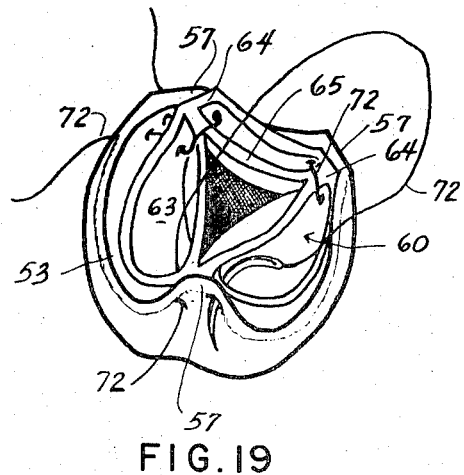
FIG. 19 is a ventricular view in perspective of a succeeding stage in the operation of attaching the homograft to the support ring.

When the base 67 of each cusp 65 is attached to the ring 30, the ring 30 and valve 60 are inverted, and the commissures 64 are elevated to their fullest height to assume the proper suspension of intervening cusps 65. Three mattress sutures 72 through the openings 42 secure firmly the extremely tough fibrous apical attachment of the commissure 64 where most of the strain is borne during valve closure (FIG. 19).

Figure 20:
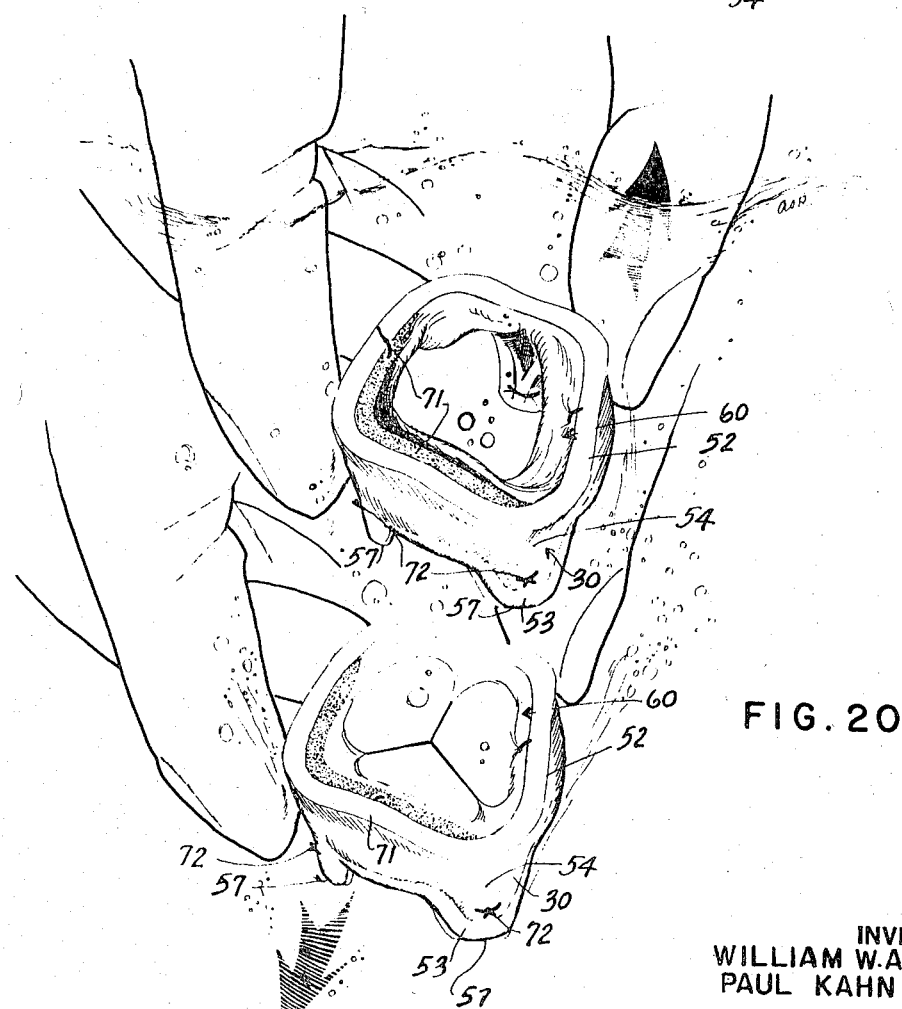
FIG. 20 is an atrial view of the testing of a partially secured homograft, shown in two positions as it is being inserted in fluid, one of the two positions being with the valve open and the other with it closed.

Prior to further suturing, the valve 60 is easily tested in a clear basin of Ringer's lactate to assure competence of the valve. Gentle pressure on the cusp 65 with a smooth, rounded instrument will indicate exact direction of travel for each cusp 65 upon closure (FIG. 20). Leaflet sag or prolapse can be corrected by raising the commissural attachment 64 or by selecting a larger ring size. Failure of coaptation is usually best corrected with a smaller ring size.

Figure 21:
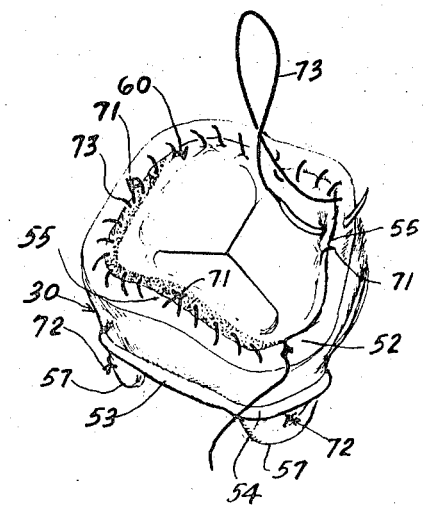
FIG. 21 is an atrial view in perspective showing the next stage of attaching the atrial end of the valve to the support ring.
Figure 22:
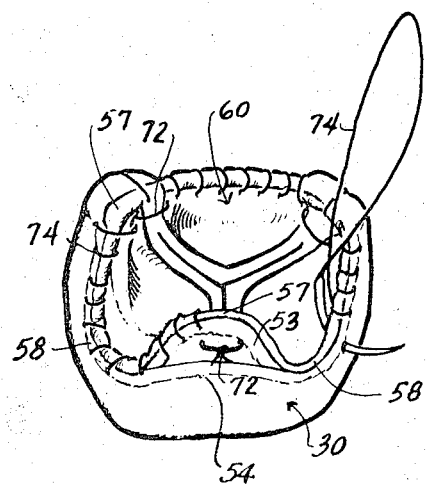
FIG. 22 is a ventricular view in perspective showing the next stage of attaching the ventricular end of the valve to the support ring.

After testing, the base 67 of the cusp attachment is secured with suitable suture material 73, such as #3–0 Tevdek, to prevent valve dehiscence (FIG. 21). Again care must be exercised not to retract the muscular cusp attachment. Finally the aortic cuff is fastened with a running over-and-over stitch of material 74 such as #3–0 Tevdek (FIG. 22).

Figure 24:
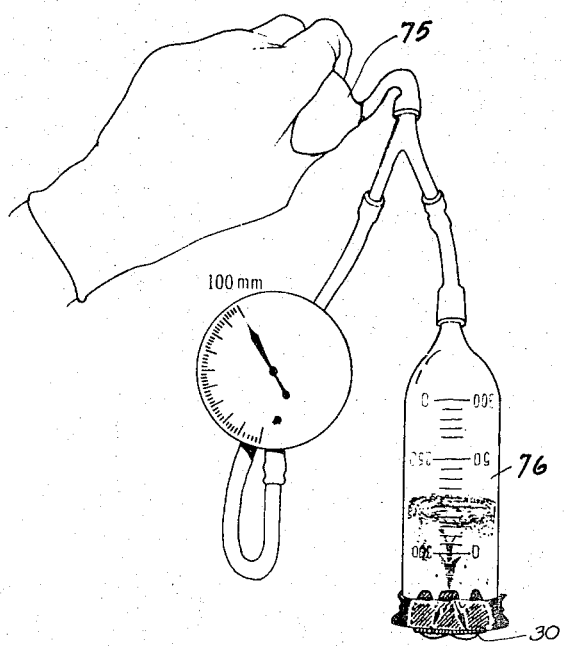
FIG. 24 is a view in side elevation of the valve of FIG. 23 being subjected to pressure testing of its leaflets.
Figure 23:
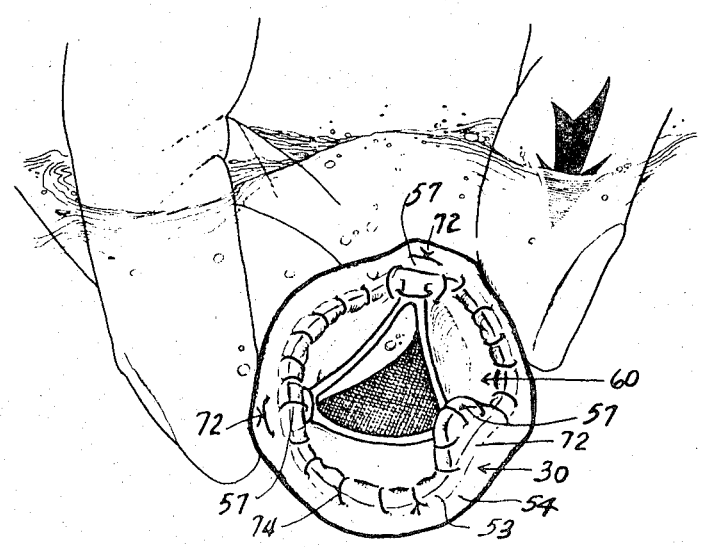
FIG. 23 is a ventricular view in perspective of a fully attached valve being tested in fluid.

Final testing of the valve 60 may be carried out in a clear basin of Ringer's lactate (FIGS. 23 and 24). A rubber bulb syringe 75 can be fitted to a diaphragm 76 and will enable pressure application and testing of the leaflets at pressures up to 120 mm. Hg.

Figure 25:
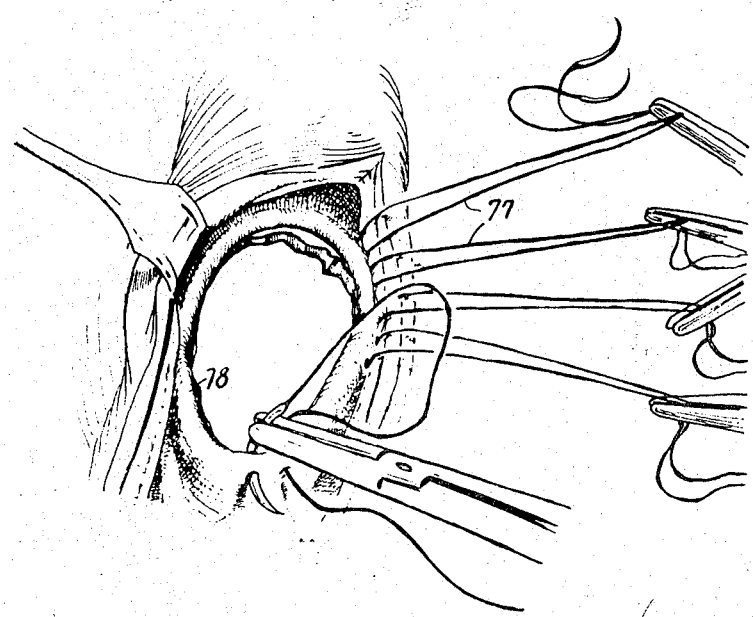
FIG. 25 is a fragmentary view in perspective illustrating sutures through the annulus preparatory to securing the valve and its ring to the patient in a mitral replacement.

The ring 30 and mounted valve 60 are inserted in a manner similar to that employed for the insertion of a prosthetic valve. For mitral replacement #2–0 Tevdek sutures 77 are placed through the atrioventricular ring 78 of the patient, from the ventricular to atrial surface in a continuous line of double strands. Sixteen to twenty-two mattress sutures 77 are employed (FIG. 25). When possible, the aorta is left unclamped and coronaries are perfused through the aortic root. If aortic cross-clamping is necessary, local hypothermia with saline at 4° C. is preferably employed for myocardial protection. Intervals up to two hours have been tolerated well.

Figure 27:
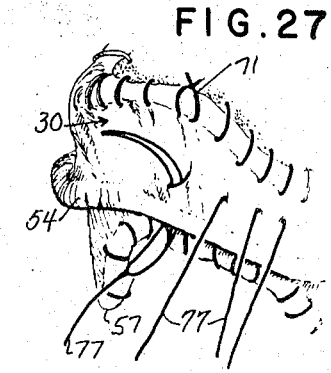
FIG. 27 is a fragmentary enlarged view of a portion of FIG. 26.
Figure 28:
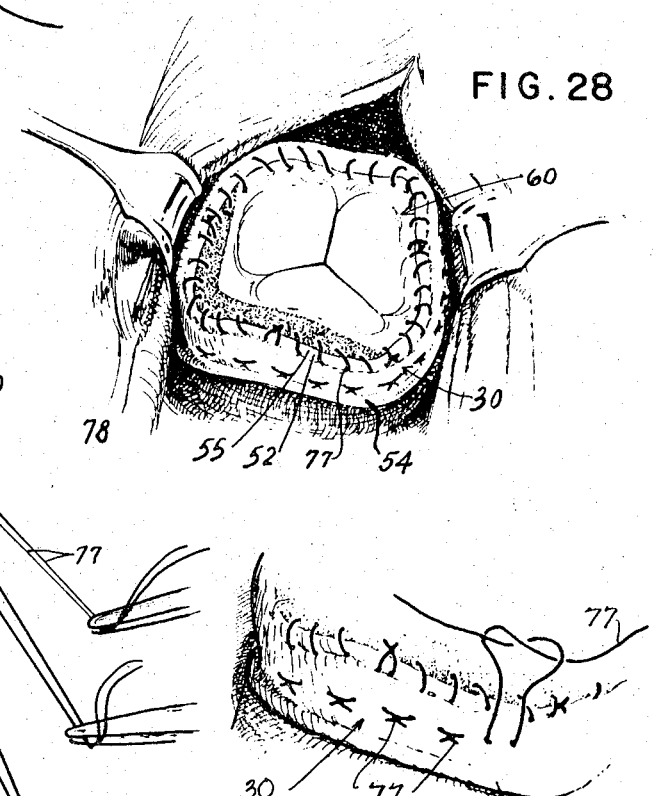
FIG. 28 is a fragmentary view in perspective of the valve and ring in position in the patient's heart at completion of the insertion.
Figure 26:
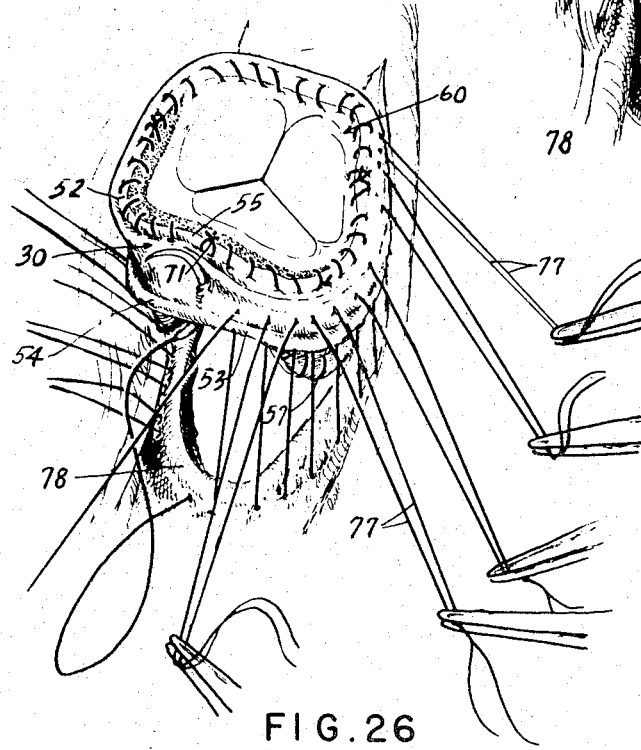
FIG. 26 is a view like FIG. 25 showing the sutures being secured loosely through the ring at the beginning of installation of the homograft valve.
Figure 29:
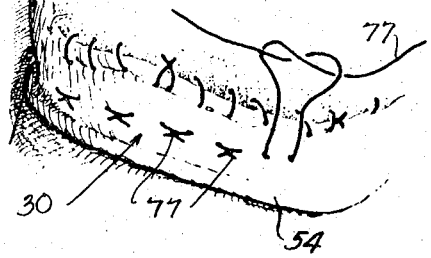
FIG. 29 is a fragmentary enlarged view of a portion of FIG. 28.

The sutures 77 are then placed through the external flange of the support ring (FIGS. 26 and 27). The ring 30 is oriented so that no commissure post 64 is directly in the aortic outflow tract. The valve 60 is pushed gently into position, being absolutely certain that the posts 64 slide past the atrioventricular ring 78 and lie in the ventricle. After assuring that the sutures 77 are straight, they are pulled up and tied into place (FIGS. 28 and 29).

Caution is exercised in placement and orientation of the ring 30 and homograft 60 in a small ventricle to prevent compromising the left ventricular outflow tract. The homograft 60 and ring 30 should be installed as high as possible in the mitral annulus consistent with good placement.

Left ventricle and ascending aorta may be vented with a 20 gauge needle through the cardiac apex and ascending aorta. For concomitant repair of the aortic valve, the aorta is cross-clamped and incised. The left coronary artery is perfused while aortic and mitral valves are removed. Thus, the mitral and then the aortic valves are replaced. The aorta is repaired and the clamps released, so that both coronary arteries are again perfused. Extreme care is taken to avoid residual left ventricular air since, unlike a prosthetic valve, the homograft valve cannot be easily held incompetent.

All patients with prosthetic material exposed to the blood stream are preferably anticoagulated for 2–3 months post-operatively. With Caumadin (Warfarin sodium, Endo Laboratories, Inc.), as an anticoagulant, prothrombin times are maintained at 20±2%. Anticoagulants may be discontinued after ten weeks with the belief that the endothelialized surface will not form thrombus. Otherwise patients may be treated as any valve replacement with gradually increasing activity.

It may be of interest that the first eleven patients to have undergone mitral and/or tricuspid valve replacement with supported fresh aortic homografts included three double homograft replacements with concomitant replacement of both aortic and mitral valves, and a triple valve replacement in which support rings 30 were utilized in both atrioventricular positions. In double and triple homograft replacements direct suturing technique is employed for subcoronary valve placements.

The ring of this invention is thus utilized not only as a mitral valve replacement or tricuspid valve replacement, that is, it is used not only in the atrial-ventricular position, but also is used in the subcoronary position as a replacement for the aortic valve.

The valve support ring's shape and design has been compared with the natural heterograft valve from dogs, pigs and calves and conforms generally to the shape of those valves also. In experimental laboratories trials have been conducted of transplantation of both dog valves and pig valves using the same ring, and function appeared to be perfectly adequate, with these two species as well as the regularly used fresh human homograft valves. The purpose of using heterograft valves is to obtain tissue valves in much larger number and much more relatively normal and young strong tissues from animals rather than being required to obtain the valves from recently deceased persons, which valves are in short supply and are oftentimes not normal. These heterograft animal tissue valves may be used as replacements for both aortic and mitral valves in humans.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A graft-support ring for valve transplantation, including in combination:
    an annular metal frame having three spaced ventricular projections extending generally parallel to the axis of the frame, and
    a fabric covering completely enclosing said frame and supported by it and having a plurality of rolled edges generally following the edges of said frame and providing a support to which the graft valve and the host heart tissue can be stitched.

2. A graft-support ring for homograft and heterograft valve transplantation, including in combination:
    an annular rigid frame having a base circle, a first inturned segment extending from said base circle to provide a plurality of apices alternating regularly and evenly with depressions, and a second inturned segment on the opposite side of said base circle from said first segment and providing a plurality of struts, said second inturned segment being inturned less sharply than said first segment and said struts and apices terminating at about the same radius from an axis passing through the center of said base circle and perpendicular to the plane of said base circle, and
    a fabric covering completely enclosing said frame and substantially following its shape and providing thickened portions at the edges thereof for reception of sutures.

3. The graft-support ring of claim 2 wherein said frame is made from a single continuous piece of titanium.

4. The graft-support ring of claim 2 wherein said fabric is a nonabsorbent material.

5. The graft-support ring of claim 4 wherein said fabric is knitted from threads of tetrafluoroethylene.

6. A graft-support ring for homograft and heterograft valve transplantation, including in combination:
    a continuous titanium annulus having a base circle, a first conical segment extending from said base circle at a surface-to-axis angle of about 70° and comprising three flat arcuate apices alternating regularly and evenly with depressions, and a second conical segment extending from the opposite side of said base circle from said first segment at a surface-to-axis angle of about 77° and providing three struts centered between said apices, said struts and apices terminating at the same radius from the axis of the cones, and
    a tetrafluoroethylene fabric covering completely enclosing said frame and following its shape and providing thickened portions upon the edges thereof for reception of sutures.

7. The graft-support ring of claim 6 wherein there is a through opening near the extremity of each said strut.

8. A graft-support ring for homograft and heterograft valve transplantation, including in combination:
    a generally annular metal frame comprising shell portions of two cones lying on opposite sides of a common base circle,
    the shell portion of one of said cone having three atrial apices spaced evenly around said base circle, with flat terminal arcuate edges and separated from each other by three smoothly curved atrial depressions dipping to said base circle, and
    the shell portion of the other said cone having three ventricular struts each opposite the nadir of a said depression and evenly spaced around said base circle and separated from each other by three ventricular reliefs coinciding with said base circle and smoothly connected to said struts, and
    a nonabsorbent fabric covering completely enclosing said frame and providing a support to which the graft valve and the host heart tissue can be stitched.

9. The graft-support ring of claim 8 wherein said first cone has a surface-to-axis angle of about 70° and said second cone has a surface-to-axis angle of about 77°, said apices and struts terminating at the same radius from the common axis of the two cones.

10. The graft-support ring of claim 8 wherein said metal is titanium.

11. The graft-support ring of claim 8 wherein said fabric is knitted tetrafluoroethylene.

12. The graft-support ring of claim 8 wherein said fabric covering has a first rolled edge generally following the edge of the atrial apices and depressions, a second rolled edge generally following the edge of the ventricular struts and reliefs and a third rolled edge generally following the edge of the ventricular relief and crossing from relief to relief across said struts.

13. A method of graft valve transplantation with the aid of a graft-support ring having an annular rigid frame providing an atrial edge on one end and a plurality of ventricular struts on the other, said frame being enclosed in a fabric covering having thickened edges at each end of the frame, comprising the steps of:
    dissecting excess aorta, myocardium, and adventitia from a graft valve while leaving a cuff of aorta in each sinus and above each commissural attachment,
    first, attaching the base of the cusp of said graft valve at the centers of the sinuses to the thickened edge at the atrial end while bringing the leading edge of the cusp attachments to the ring edge in two of the three sinuses and securing the right coronary sinus which has a muscular attachment to the ventricle, above the free edge of the cusp base in order to prevent retraction of the cusp,
    next, elevating the commissures to their fullest height,
    then, attaching the commissural attachments to the thickened edge at said struts, then, inserting the valve and ring into a patient's heart, sliding the parts past the atrioventricular ring into the ventricle, and finally, attaching the thickened edges to the patient's heart while perfusing the arteries.

14. A method of graft valve transplantation with the aid of a graft-support ring having an annular rigid frame providing three atrial apices on one end and three ventricular struts on the other, both the apices and struts sloping inwardly along conical surfaces from a common base circle, said frame being enclosed in a fabric covering having rolled edges along each edge of the frame, comprising the steps of:

dissecting excess aorta, myocardium, and adventitia from a graft valve while leaving a cuff of aorta in each sinus and above each commissural attachment, sizing the valve and choosing a graft-support ring of appropriate size for the valve, next, attaching the base of the cusp of said graft valve at the center of the sinuses to a said rolled edge at the atrial apices by sutures through tough fibrous tissue, while bringing the leading edge of the cusp attachments to the ring edge in two of the three sinuses and securing the right coronary sinus which has a muscular attachment to the ventricle above the free edge of the cusp base in order to prevent retraction of the cusp, then, inverting the ring and valve, elevating the commissures to their fullest height to assume the proper suspension of intervening cusps and firmly attaching the tough fibrous apical attachments of the commissures by mattress sutures to the rolled edge at said struts, next, testing the valve in Ringer's lactate to assure competence of the valve, then, stitching the base of the cusp attachment to said atrial rolled edge, next, stitching the aortic cuff to said ventricular rolled edge, then, testing the operability of the secured valve in Ringer's lactate, next, passing a series of mattress sutures through the atrioventricular ring of the patient's heart, from the ventricular to atrial surface in a continuous line of double strands, then, placing the valve and ring adjacent the patient's heart and attaching the series of sutures to the rolled edge at the atrial end thereof, next, orienting the ring so that no commissure post is directly in the aortic overflow tract and then pushing the valve and ring into position with the posts being slid past the atrioventricular ring so that they lie in the ventricle, and next, pulling the sutures up and tying them into place.

15. The method of claim 14 wherein, during insertion, the aorta is left unclamped and coronaries are perfused through the aortic root.

16. A graft-support ring for homograft and heterograft valve transplantation, including in combination:

an annular rigid frame having a base circle, an inturned segment extending from said base circle to provide a plurality of inturned struts, and a fabric covering completely enclosing said frame and substantially following its shape and providing thickened portions at the edges thereof for reception of sutures.

17. A graft-support ring for homograft and heterograft valve transplantation, including in combination:

a generally annular metal frame comprising shell portions of a cone and a base circle having three ventricular struts and evenly spaced around said base circle and separated from each other by three ventricular reliefs coinciding with said base circle and smoothly connected to said struts, and a nonabsorbent fabric covering completely enclosing said frame and providing a support to which the graft valve and the host heart tissue can be stitched.

18. The ring of claim 17 wherein said cone lies at a surface-to-axis angle of about 77°.

References Cited

"Evolution of Aortic Valvular Prostheses," by E. B. Kay et al., J. of Thoracic & Cardiovascular Surgery, vol. 45, No. 3, March 1963, pp. 372–381.

"A Hinged-Leaf Valve for Total Replacement of the Human Aortic Valve," by V. L. Gott et al., J. of Thoracic & Cardiovascular Surgery, vol. 48, No. 5, pp. 713–725.

"Simplified Insertion of Aortic Homograft Valves With Nonthrombogenic Prosthetic Frames," by N. S. Braunwald et al., Trans. Amer. Soc. Artif. Internal Organs, April 1967, pages 111–113.

"Heterograft Aortic Valves for Human Use," by M. F. O'Brien, J. of Thoracic & Cardiovascular Surgery, vol. 53, No. 3, March 1967, pp. 392–397.

"Fixation of Aortic Valve Homografts With Metal Rings," by A. S. Geha et al., J. of Thoracic & Cardiovascular Surgery, vol. 54, No. 5, November 1967, pp. 605–615 and 628–629.

RICHARD A. GAUDET, Primary Examiner

R. L. FRINKS, Assistant Examiner

U.S. Cl. X.R.

128—334